Figure 1:
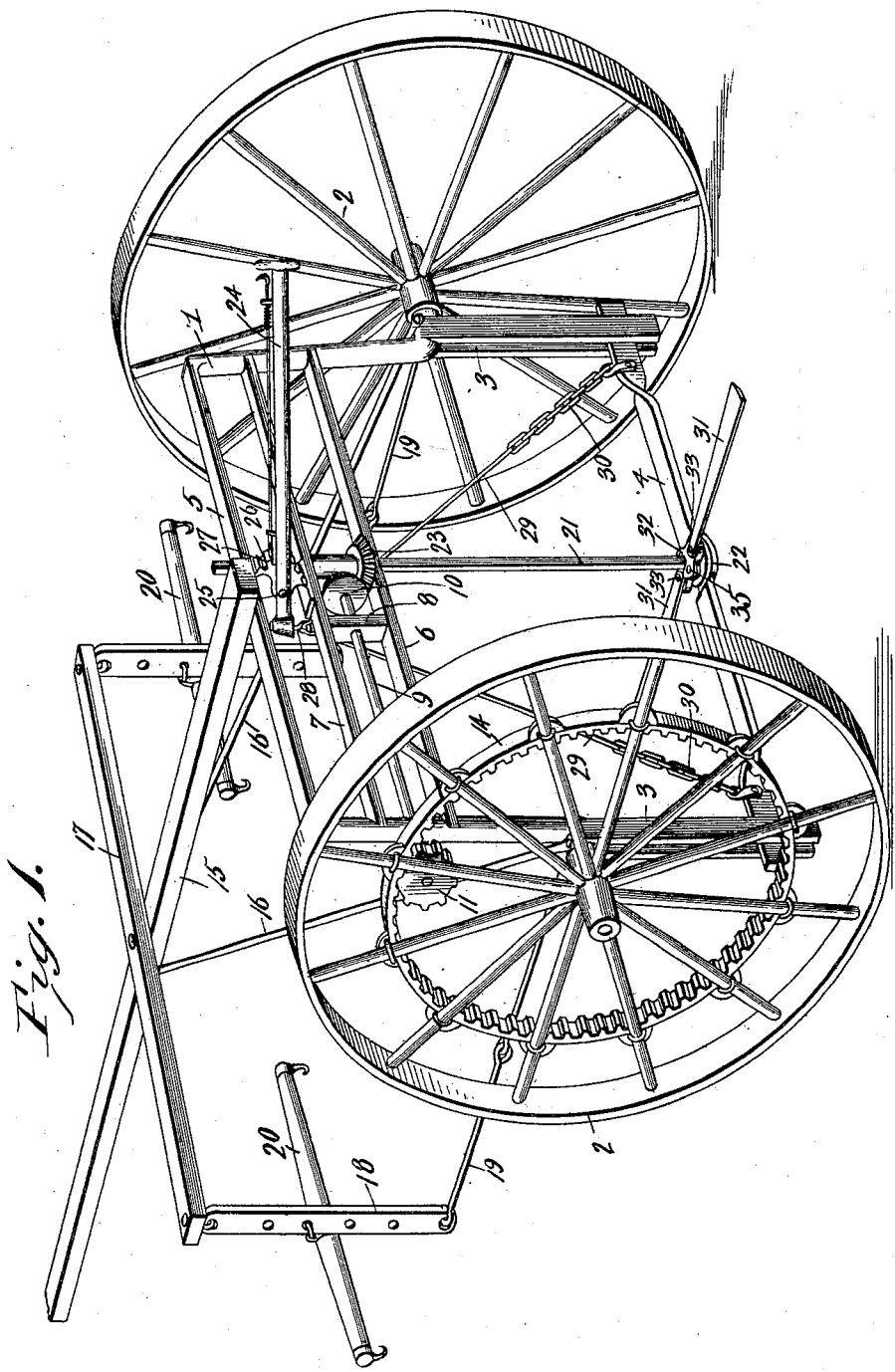

No. 682,738. Patented Sept. 17, 1901.
G. W. PALM.
COTTON TOPPING MACHINE.
(Application filed Jan. 17, 1901.)
(No Model.) 2 Sheets—Sheet 1.

Witnesses
G. W. Palm, Inventor.
by C. A. Snow & Co.
Attorneys

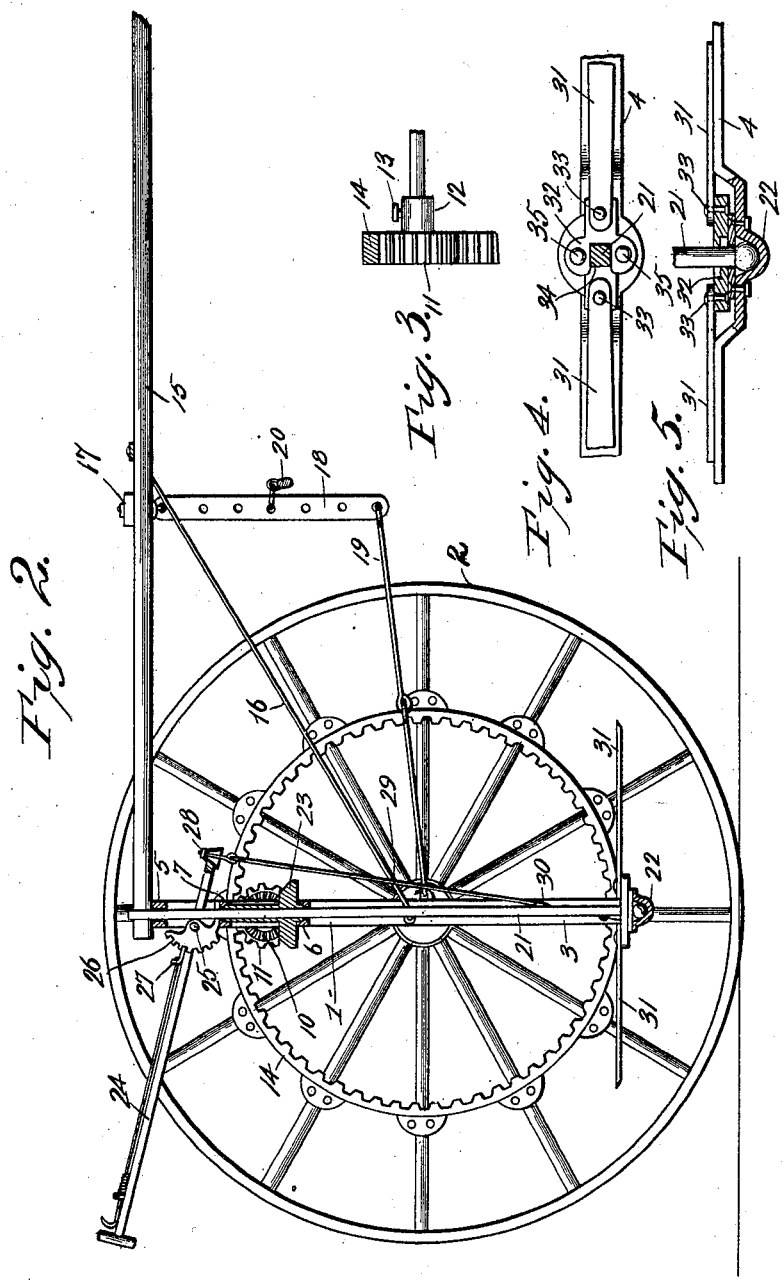

UNITED STATES PATENT OFFICE.

GEORGE WM. PALM, OF ROUNDROCK, TEXAS.

COTTON-TOPPING MACHINE.

SPECIFICATION forming part of Letters Patent No. 682,738, dated September 17, 1901.

Application filed January 17, 1901. Serial No. 43,654. (No model.)

*To all whom it may concern:*

Be it known that I, GEORGE WM. PALM, a citizen of the United States, residing at Roundrock, in the county of Williamson and State of Texas, have invented a new and useful Cotton-Topping Machine, of which the following is a specification.

My invention is an improved machine for topping cotton-plants at a suitable stage of their growth to cause the plants to grow more compactly and increase the yield thereof; and it consists in the peculiar construction and combination of devices hereinafter described and claimed.

The object of my invention is to provide a light, cheap, and simple machine for topping cotton-plants which is adapted to be driven between the rows of growing plants and to be so adjusted as to cut off the tops of the plants at any desired height.

In the accompanying drawings, Figure 1 is a perspective view of a cotton-topping machine embodying my improvements. Fig. 2 is a vertical longitudinal sectional view of the same. Figs. 3, 4, and 5 are detail views.

In the construction of my improved cotton-topping machine I provide an arched axle 1, on which the supporting and traction wheels 2 are mounted, and which arched axle is provided with depending standards 3, which are slotted or may be spaced apart and form guideways for a vertically-movable cross-bar 4. The sides of the arched axle are connected together at a suitable distance from the upper central portion 5 thereof by a cross-bar 6. A similar cross-bar 7 connects the sides of the arched axle and is disposed at a suitable distance above the cross-bar 6, about midway between the latter and the upper portion 5 of the axle. The cross-bars 6 7 are connected together near the centers thereof by a bracket or plate 8, which forms a bearing for a horizontally-disposed shaft 9, the outer portion of which has a bearing in one side of the arched axle. At the inner end of the shaft 9 is a miter gear-wheel 10. On the outer end thereof is a spur-pinion 11, which is adjustable on said shaft. Said pinion has a sleeve 12 on its inner side and a set-screw 13, the latter serving to secure said pinion at the requisite adjustment on said shaft. Said pinion is adapted to engage and disengage a gear 14, which revolves with one of the wheels 2 and may be either of the form here shown or of any other suitable form.

The tongue 15 has its rear end secured on the central portion of the arched axle. Brace-rods 16 connect the tongue and the arched axle at points near the spindles of the latter. A draft-bar or doubletree 17 is pivotally bolted on the tongue. Draft-links 18 depend from the ends of said doubletree, and the lower ends of said draft-links are connected to the arched axle at points near the spindles thereof by draft-rods of chains 19. The said links 18 serve for the attachment of the single-trees 20, which are vertically adjustable thereon, as shown. It will be understood from the foregoing that the tongue together with the arched axle and depending standards 3 and the brace-rods 16 constitute the frame of the machine. I would have it understood that this frame may be of any other suitable construction, and I do not desire to limit myself in this particular.

A vertical shaft 21 has bearings in the cross-bars 5 6 7 and has its lower end stepped in a bearing 22 of suitable construction in the center of the vertically-adjustable cross-bar 4. A miter gear-wheel 23 is feathered or splined on said shaft, so that the latter is movable vertically through said gear-wheel, and said gear-wheel 23 engages the miter-gear 10 on shaft 9, and hence when the pinion 11 is in engagement with gear 14 and the machine is in operation rotary motion is communicated to shaft 21. A lever 24 is fulcrumed on a standard or bracket 25, which is bolted on the cross-bar 7. Said bracket or standard has a segment-rack 26, and said lever has the usual spring-pressed dog 27 to engage said segment-rack, and thereby lock said lever at any desired adjustment. The inner end of the lever 24 carries an eyebolt 28, which is adjustable therein and to which are attached hoisting rods or links 29, at the lower ends of which are adjusting-chains 30, which are hooked to the end portions of the vertically-adjustable cross-bar 4. From the foregoing it will be understood that said cross-bar 4 may be raised or lowered and supported at any desired height.

The shaft 21 is angular in cross-section throughout the major portion of its extent and is provided with a pair of cutting-blades 31. Each of the said cutting-blades is pivotally attached to a plate 32 by a bolt 33. The said plates 32 are provided with angular openings 34 to receive the angular portion of the shaft 21. Said plates are overlapped, the one disposed above the other, and bolted together by bolts 35. Thereby the blades 31 are revolved by the revoluble shaft 21, the edges of said blades coacting with the edges of the vertically-adjustable cross-bar 4 to chop off the tops of the cotton-plants in order to cause the plants to grow more compactly and to increase the yield thereof. It will be understood that the revoluble chopper-blades, together with the shaft 21, are vertically adjustable with the cross-bar 4. The centrifugal force developed by the rotary motion of the shaft 21 tends to dispose the chopping-blades 31 radially with relation to said shaft while the machine is in operation. In the event that an obstruction is encountered the blade which strikes it will turn on its pivot-bolt 33, and thereby injury to the blade will be avoided.

It will be understood that the machine will be provided with a suitable seat for the driver.

Having thus described my invention, I claim—

1. In a cotton-topping machine, the combination of a frame having vertical guideways, a cross-bar engaging said guideways, means to raise and lower said cross-bar, a revoluble shaft supported by said cross-bar and a chopping device carried by said shaft, said chopping device adapted to coact with said cross-bar, substantially as described.

2. In a cotton-topping machine, a revoluble shaft and chopping-blades, one or more, pivotally connected to and carried by said revoluble shaft, in combination with a relatively-fixed cross-bar, said cross-bar and revoluble chopping-blades adapted to coact, substantially as described.

3. In a cotton-topping machine, the combination of a frame, supporting and traction wheels therefor, vertical guides with which said frame is provided, a cross-bar adjustable in said guides, a vertically-disposed shaft supported by said cross-bar, adjustable therewith and provided with chopping-blades, the latter and said cross-bar adapted to coact, and gears connecting one of said wheels to said shaft, substantially as described.

In testimony that I claim the foregoing as my own I have hereto affixed my signature in the presence of two witnesses.

GEORGE WM. PALM.

Witnesses:
F. M. FERRELL,
C. E. BROOKS.